United States Patent
Decker

(10) Patent No.: US 7,468,345 B2
(45) Date of Patent: Dec. 23, 2008

(54) GRAFFITI CLEANING SOLUTION INCLUDING A NON-AQUEOUS CONCENTRATE AND DILUTED AQUEOUS SOLUTION

(75) Inventor: James D. Decker, Las Vegas, NV (US)

(73) Assignee: ECO Holdings, LLC, Miami, FL (US)

( * ) Notice: Subject to any disclaimer, the term of this patent is extended or adjusted under 35 U.S.C. 154(b) by 4 days.

(21) Appl. No.: 11/540,330

(22) Filed: Sep. 29, 2006

(65) Prior Publication Data

US 2008/0081778 A1 Apr. 3, 2008

(51) Int. Cl.
 *C11D 1/72* (2006.01)
 *C11D 7/26* (2006.01)
 *C11D 9/26* (2006.01)

(52) U.S. Cl. .............. 510/201; 510/174; 510/203; 510/206; 510/211; 510/413; 510/421; 510/437; 510/505

(58) Field of Classification Search ............... 510/174, 510/201, 203, 206, 211, 413, 421, 437, 505
See application file for complete search history.

(56) References Cited

U.S. PATENT DOCUMENTS 4,934,391 A * 6/1990 Futch et al. ............... 134/40
5,565,136 A * 10/1996 Walsh ....................... 510/203
5,932,530 A * 8/1999 Radu et al. ................ 510/212
6,191,087 B1 * 2/2001 Opre et al. ................ 510/201

* cited by examiner

*Primary Examiner*—Brian P Mruk
(74) *Attorney, Agent, or Firm*—Laurence A. Greenberg; Werner H. Stemer; Ralph E. Locher

(57) ABSTRACT

A concentrated non-aqueous cleaning solution having a long shelf life includes an ester and an anhydrous surfactant. The ester is the active ingredient for dissolving graffiti, grease and other contaminants. The ester can be one of or a mixture of dimethyl glutarate, dimethyl succinate, dimethyl adipate, ethyl lactate, and a methyl ester extracted from soybean oil. The anhydrous surfactant is preferably alcohol ethoxylate. The ester in the concentrated solution does not degrade into an acid and alcohol as long as the solution is not mixed with water. This allows the concentrated solution to be shipped and stored and remain efficacious. The concentrate can be diluted with water immediately prior to use. Diluting before use makes the graffiti cleaner less expensive and prevents damage to sensitive surfaces but does not provide long enough time for the ester to degrade.

1 Claim, No Drawings

GRAFFITI CLEANING SOLUTION INCLUDING A NON-AQUEOUS CONCENTRATE AND DILUTED AQUEOUS SOLUTION

BACKGROUND OF THE INVENTION

1. Field of the Invention:

The invention relates to concentrated cleaning products with stabilized ester components.

2. Description of the Related Art:

Graffiti is a form of vandalism in which a wall or surface is painted or marked. Graffiti typically involves paints, inks, and/or permanent markers.

Removing graffiti with power solvents is possible but their use can be hazardous to the person cleaning the graffiti and in the long run can be hazardous to the environment. In addition, the solvents present fire hazards during storage and transport.

Non-liquid methods of removing graffiti such as scrapping or scrubbing are ineffective when the surface being cleaning is porous or uneven.

Lastly, the graffiti remover must be selective in the paint that is being dissolved. If the underlying surface is painted, the graffiti remover should be gentle enough not to remove the underlying paint.

Cleaning solutions using esters are known. However, their use has been limited because they are unstable in aqueous solutions. In particular, when ester-based cleaning solutions sit in an aqueous solution, the ester begins to decompose. The decomposing ester produces undesirable and potentially hazardous byproducts. Furthermore, as the ester decomposes, the amount of ester, which is the active ingredient in the cleaning solution, is decreasing.

Esters cannot be used in any water-based products for extended periods of time without the esters decomposing into an acid and an alcohol over time, as described in Formula I.

$$RCO_2R_{(aq)} \rightarrow RCOOH + HOR \qquad (I)$$

As a result, the pH of the product decreases.

For these reasons, a need exists for a graffiti remover and other cleaners utilizing an ester that can be shipped and stored without degrading.

BRIEF SUMMARY OF THE INVENTION

It is accordingly an object of the invention to provide a concentrated non-aqueous graffiti cleaning solution that overcomes the above-mentioned disadvantages of the heretofore-known compositions of this general type.

An object of the invention is to provide an ester-based concentrated cleaning solution with extended shelf-life that can be reconstituted for use by adding water immediately before using.

During development of the product, it was discovered that esters could not be used in any water-based products without the esters decomposing into an acid and an alcohol over time. This lead to the discovery that these esters do not decompose when the formulations are made without water. The customer can add the water at a later date and then use the products quickly (i.e. within one month or less) before the degradation significantly impacts the ester and, therefore, the efficacy of the product.

A further object of the invention is to provide a concentrated product that can be shipped in a stable form at minimal costs. The concentrated non-aqueous graffiti remover solution according to the invention achieves this object because the shipping cost is lowered because the manufacturer is shipping only the active ingredients. The end user than can dilute the concentrate before use. Therefore, the manufacturer then saves the cost of shipping the water. Likewise, because the volume of the container is less, the cost of packaging the concentrated solution is less than shipping a diluted solution. Finally, the esters, which are the primary active ingredient in the graffiti remover, are stable during shipping and on shelves as long as they are not exposed to water. So by shipping the product in a concentrated non-aqueous form the shelf life is extended to at least a year, whereas a diluted aqueous solution should be used within the month that it is prepared.

With the foregoing and other objects in view there is provided, in accordance with the invention, a concentrated non-aqueous graffiti cleaning solution having a long shelf life (i.e. at least twelve months). The active ingredient in the solution is an ester. The ester is dimethyl glutarate, dimethyl succinate, dimethyl adipate, ethyl lactate, and a methyl ester produced from soybean oil. In addition to being able to use one of the esters, the solution can use a combination of the esters.

In addition, the solution should include an anhydrous surfactant. The anhydrous surfactant promotes mixing with the water when the concentrate is diluted. In addition, the surfactant helps in the wetting of the surface to be cleaned. Finally, the surfactant works with the ester to help clean and remove the composition, graffiti, and other contaminants from the surface.

A particularly effective non-aqueous surfactant has been found to be alcohol ethoxylate. In addition, alcohol ethoxylate is preferred for environmental reasons. Other possible non-aqueous surfactants include alkylphenol ethoxylate, secondary alcohol ethoxylate, and ethylene oxide/propylene oxide co-polymers.

In accordance with a further object of the invention, a concentrated non-aqueous solution with ten to ninety percent by weight of the ester has been found to be effective. Likewise, the anhydrous surfactant can form ten to ninety percent by weight of the non-aqueous solution.

A number of other detergent components can be added such as glycol ether solvents, dyes, fragrances, and water conditioners.

In accordance with a further object of the invention, a diluted graffiti remover solution can be made from the concentrated non-aqueous solution. The diluted solution is gentler on delicate surfaces. In addition, the diluted solution is less expensive per volume because it is dissolved with water. When water is mixed with ester component of the non-aqueous concentrate, the ester component begins to degrade. Therefore, the dilute solution should be used within one month of dilution and preferably as quickly as possible after dilution. Low dilution formulations are formed by mixing one part by volume of non-aqueous concentrated graffiti cleaning solution with up to three parts by volume of water. High dilution formulations are formed by mixing one part by volume of concentrate with three to five parts by volume of water. Greater than one-to-five mixtures are possible but the efficacy of the dilution may diminish. Dilutions as high as one-to-ninety nine have been found to be efficacious.

Other features that are considered as characteristic for the invention are set forth in the appended claims.

Although the invention is described herein as embodied in a concentrated non-aqueous graffiti cleaning solution and a diluted graffiti cleaning solution, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying examples.

DETAILED DESCRIPTION OF THE PREFERRED EMBODIMENTS

Referring now to examples, the invention encompasses a concentrated non-aqueous cleaning solution effective for removing graffiti, grease, contaminants, and functioning as a general purpose cleaner.

An active ingredient of the concentrated non-aqueous solution is an ester. The ester can be a single ester or may be a mixture of several esters. Preferred esters include dimethyl glutarate, dimethyl succinate, and dimethyl adipate. Effective solutions have also used ethyl lactate and the methyl esters of soybean oil.

The second ingredient of the concentrated non-aqueous solution is an anhydrous surfactant. The anhydrous surfactant forms ten to ninety percent by weight (10-90 wt %) of the concentrated non-aqueous solution. While most anhydrous surfactants work, alcohol ethoxylates are preferred. Examples of other anhydrous surfactants include alkylphenol ethoxylates, secondary alcohol ethoxylates, ethylene oxide/propylene oxide co-polymers, and the like.

In addition to the ester and anhydrous surfactant other anhydrous ingredients may be added. In particular glycol ether solvents, dyes, fragrances, and water conditioners can be included in the concentrate.

EXAMPLE 1

The following formula is a preferred embodiment of the concentrated state that was used according to the method described below to remove graffiti.

| INGREDIENT | ALCOHOL LENGTH | AVERAGE MOLE ETHOXILATION | WEIGHT PERCENTAGE |
|---|---|---|---|
| Ester Mixture (Dimethyl Glutarate, Dimethyl Succinate, Dimethyl Adipate) | | | 40 |
| Alcohol Ethoxylate (24-7) | 12 to 13 | 7 | 30 |
| Alcohol Ethoxylate (91-6) | 9 to 11 | 6 | 30 |

EXAMPLE 2

Example 2 is identical to Example 1 but with 5% water added to the complete solution.

The effects of removing water from the concentrated ester cleaning solution can be seen by comparing Examples 1 and 2. The solution described in Example 1 has a pH that does not drop after sixty (60) days at thirty-eight degrees Celsius (38° C.). In Example 2, the pH decreased 0.5 units after sixty (60) days at thirty eight degrees Celsius (38° C.).

For the toughest graffiti removal jobs, the concentrated non-aqueous graffiti cleaning solution can be used directly on the surface to be cleaned. The toughest graffiti removal jobs usually involve porous and durable surfaces.

More typically, the concentrated non-aqueous graffiti cleaning solution can be diluted with water before use. The concentrated non-aqueous graffiti cleaning solution can be diluted in a "low dilution" or "high dilution" depending on the surface to be cleaned.

In most situations, the low dilution is effective. A low dilution is defined as one (volumetric) part concentrated non-aqueous graffiti cleaning solution and up to three parts water. The low dilution provides an economical blend that will work on most durable surfaces.

For cleaning more delicate surfaces such as painted surfaces, a high dilution is necessary to protect the underlying surface. A high dilution is defined as one (volumetric) part concentrated non-aqueous graffiti cleaning solution and from three to five (3-5) parts water. Because it is more dilute, the high dilution is even more economical than the low dilution and the concentrated solution.

The graffiti remover solution (whether concentrated, low dilution, or high dilution) is used according to the following procedure. The graffiti remover solution is applied liberally with a brush, sponge, or cloth and the graffiti remover is worked into the graffiti to be removed. Depending upon the type and age of the graffiti, the graffiti may dissolve instantly or the graffiti remover may need to soak for up to five minuets before removal. The concentration of the graffiti remover will also impact the time involved in removing the undesired stain or graffiti. The surface may need to be brushed before removing the graffiti remover. The graffiti remover is best removed using medium or high pressure water sprays. For small areas, the graffiti remover can be used with a dry or wet cloth or sponge. The graffiti remover may attack some painted surfaces; so, compatibility test are recommended prior to cleaning.

The graffiti remover can also be used on whiteboards. The graffiti remover removes remnants left by permanent markers and residual shadowing. To clean a whiteboard, a thin coat of graffiti remover is applied to the surface. The surface is allowed to soak for up to three minutes; this softens permanent marker markings. Next, a second coating is added and removed by rubbing with a damp sponge, cloth, or non-scratch pad. Finally, the surface is rinsed with clear water or general all-purpose cleanser.

In addition to the degradation of the ester in aqueous solutions discussed previously, the graffiti remover also attacks the integrity of spray bottle containers used for dilution. Accordingly, it is not recommended to store diluted graffiti remover in a spray bottle for longer than ninety (90) days.

I claim:

1. A concentrated non-aqueous graffiti cleaning solution consisting of:
   about forty percent by weight of an ester mixture for dissolving graffiti, said ester mixture consisting of dimethyl glutarate, dimethyl succinate, dimethyl adipate;
   about thirty percent by weight of a first anhydrous surfactant consisting of an alcohol ethoxylate having an alcohol length of about 12-13; and
   about thirty percent by weight of a second anhydrous surfactant consisting of an alcohol ethoxylate having an alcohol length of 9-11;
   said composition having an undiluted shelf life of twelve months and diluted shelf life of about ninety days.

* * * * *